(12) United States Patent
Jacobson et al.

(10) Patent No.: US 7,089,395 B2
(45) Date of Patent: Aug. 8, 2006

(54) COMPUTER SYSTEMS, VIRTUAL STORAGE SYSTEMS AND VIRTUAL STORAGE SYSTEM OPERATIONAL METHODS

(75) Inventors: Michael B. Jacobson, Boise, ID (US); Lee L. Nelson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 646 days.

(21) Appl. No.: 10/264,957

(22) Filed: Oct. 3, 2002

(65) Prior Publication Data

US 2004/0068611 A1    Apr. 8, 2004

(51) Int. Cl.
G06F 12/16     (2006.01)
G06F 12/10     (2006.01)

(52) U.S. Cl. .................. 711/202; 711/6; 711/161; 707/204

(58) Field of Classification Search ............ None
See application file for complete search history.

(56) References Cited

U.S. PATENT DOCUMENTS

| | | | |
|---|---|---|---|
| 5,392,244 A | | 2/1995 | Jacobson et al. |
| 5,403,639 A | * | 4/1995 | Belsan et al. ............ 707/204 |
| 5,542,065 A | * | 7/1996 | Burkes et al. ............ 711/114 |
| 6,212,531 B1 | * | 4/2001 | Blea et al. ............... 707/204 |
| 6,434,681 B1 | * | 8/2002 | Armangau ............... 711/162 |

OTHER PUBLICATIONS

"Cassini FAQs, Snapshot"; Revision 1; Hewlett-Packard Company; May 2000; pp. 1-6.

"Business Copy Virtual Array Integration Guide", Data Replication and Backup for the HP VA 7000 Series; Revision Level 1.1; Hewlett-Packard Company; Jul. 2001; pp. ii-iv and 1-14.

U.S. Appl. No., filed Oct. 3, 2002, titled "Virtual Storage Systems and Virtual Storage System Operational Methods", by Lee L. Nelson and Rodger Daniels, (HE12-203).

U.S. Appl. No., filed Oct. 3, 2002, titled "Virtual Storage Systems and Virtual Storage System Operational Methods", by Rodger Daniels and Lee L. Nelson, (HE12-202).

U.S. Appl. No., filed Oct. 3, 2002, titled "Virtual Storage Systems, Virtual Storage Methods and Methods for Over Committing a Virtual RAID Storage System", by Michael Brent Jacobson and Lee L. Nelson, (HE12-201).

(Continued)

*Primary Examiner*—Denise Tran

(57) ABSTRACT

Computer systems, virtual storage systems, and virtual storage system operational methods are described. According to one aspect, a computer system includes a virtual storage system including a physical storage space, a virtual storage space, and a non-guaranteed available capacity utilized to generate a non-guaranteed snapshot volumes of virtual storage volumes of the virtual storage space, wherein the virtual storage system is configured to monitor the non-guaranteed available capacity and to present a report regarding the non-guaranteed available capacity responsive to the monitoring and a host configured to execute an application wherein generation of a non-guaranteed snapshot volume of at least one of the virtual storage volumes is desired, to access the report to determine the non-guaranteed available capacity, and to issue a request to the virtual storage system to generate the at least one non-guaranteed snapshot volume of the at least one virtual storage volume responsive to the accessing.

44 Claims, 4 Drawing Sheets

OTHER PUBLICATIONS

U.S. Appl. No., filed Oct. 3, 2002, titled "Method of Managing a Data Storage Array, and a Computer System Including a RAID Controller", by David Umberger and Guillermo Navarro, (HE12-199).

U.S. Appl. No., filed Oct. 3, 2002, titled "Managing a Data Storage Array, A Data Storage System, and a RAID Controller", by David Umberger, Guillermo Navarro, and Rodger Daniels, (HE12-198).

HP Virtual Array Technology; "Virtual Storage Technology Extends the Capabilities of Fault-Tolerant Storage Subsystems"; www.hp.com; Nov. 2001; pp. 1-9.

HP Executive Summary "Virtualization, Simplification, and Storage"; www.hp.com; Nov. 2001; pp. 1-9.

* cited by examiner

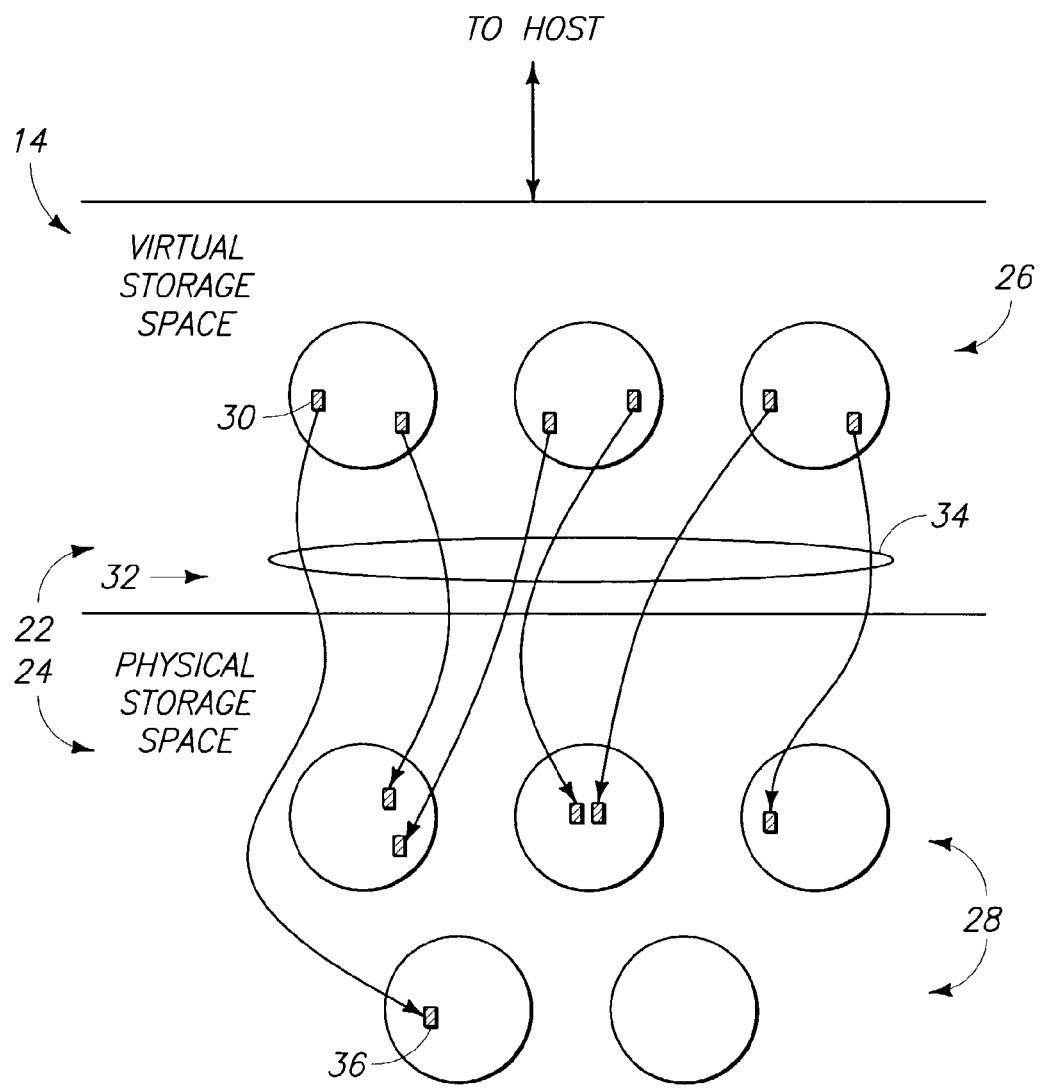

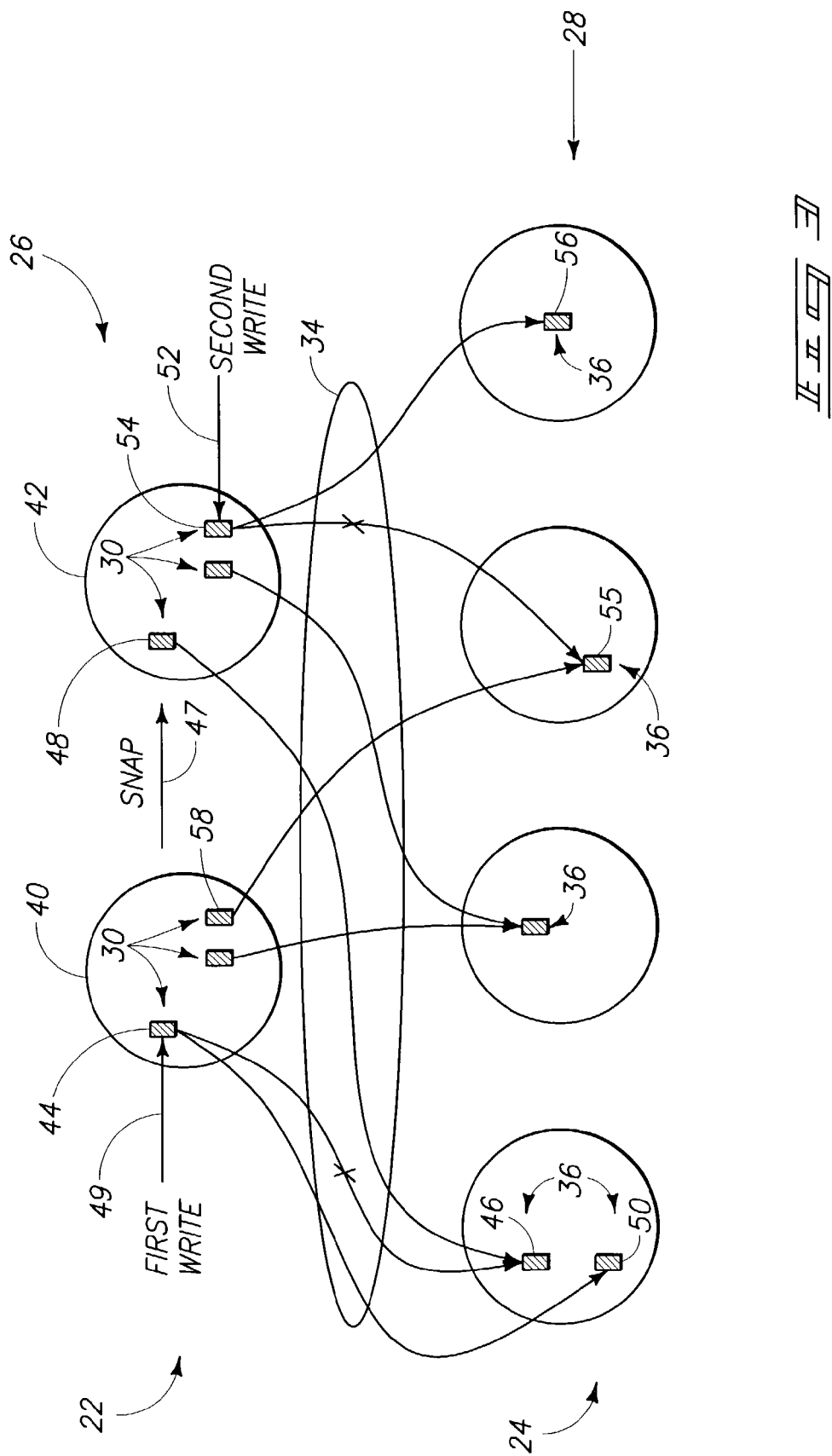

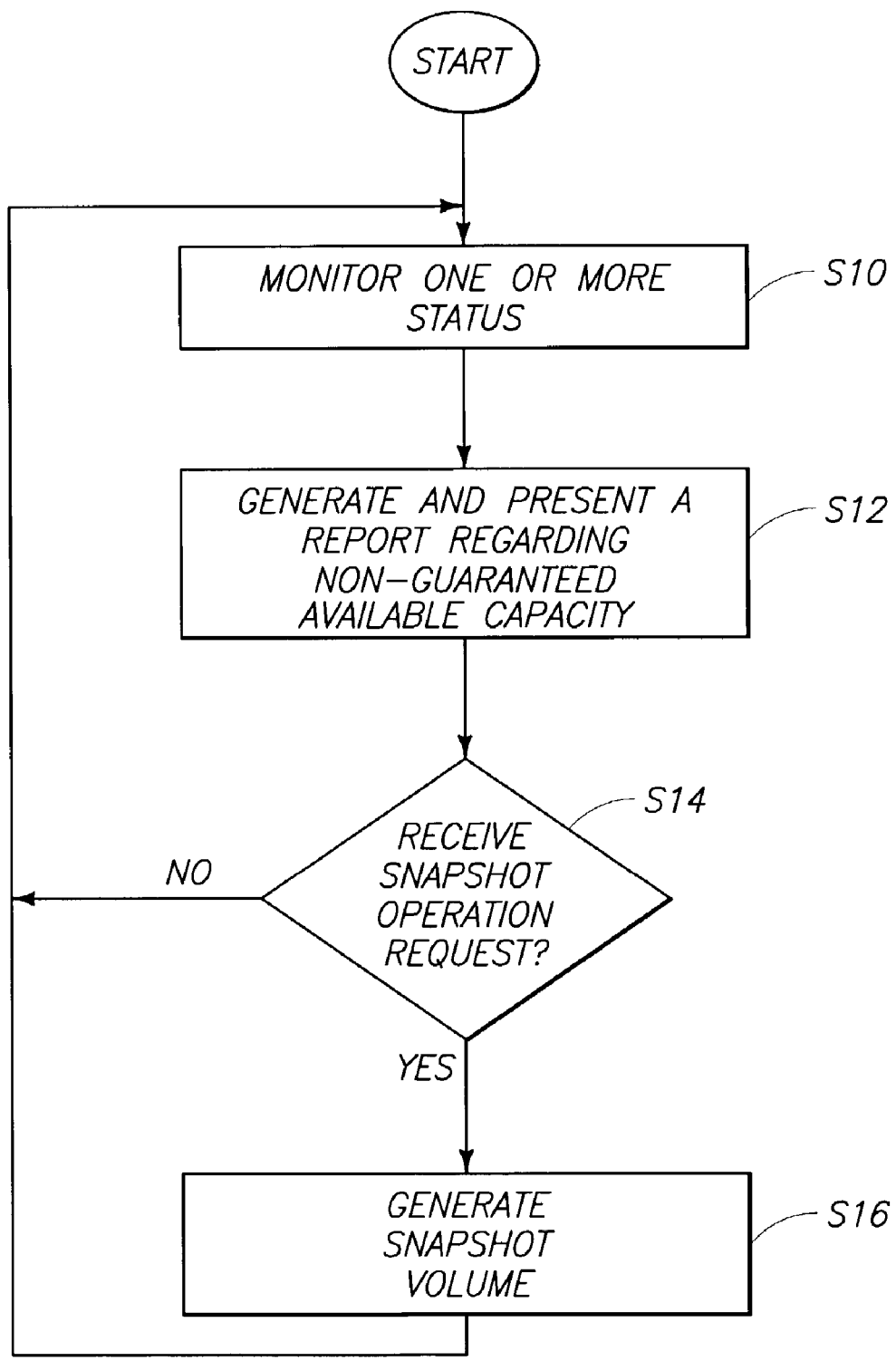

COMPUTER SYSTEMS, VIRTUAL STORAGE SYSTEMS AND VIRTUAL STORAGE SYSTEM OPERATIONAL METHODS

FIELD OF THE INVENTION

The invention relates to computer systems, virtual storage systems, and virtual storage system operational methods.

BACKGROUND OF THE INVENTION

Computer systems including hardware, software, firmware etc. have continued to experience expansive growth and sophistication in recent years. Peripherals and other components arranged to interface with computer systems have also experienced expansive growth and improvements.

In addition, computer systems are generally used in an increasing number of applications especially with the advancements made in networking solutions enabling communication between remotely spaced computers. For example, computer systems may be utilized in client applications, server applications as well as stand-alone personal computing applications.

With the increased processing speeds of computer systems, and the increasing usage of computer systems in new and varied applications, devices are desired to assist with storing and quickly accessing data processed and used by computer systems. Mass storage devices have been developed to handle large amounts of digital data utilized by computer systems. Redundant storage systems have been developed to provide continued, correct operations during the presence of a fault or other failure in a component or peripheral of a computer system. More specifically, three primary design criteria are typically considered when developing mass storage devices and include cost (low cost per unit of data storage), high input/output performance, and availability (ability to recover data even though some components have failed and to insure continued operation). Redundant array of independent disk (RAID) systems have been utilized to provide redundant storage of relatively large amounts of data.

As described below, aspects of the present invention provide improved systems and methodologies for storing and providing data for use in associated computer applications.

DESCRIPTION OF THE DRAWINGS

FIG. 2 is an illustrative representation of an exemplary storage system of the computer system implemented as a virtual storage system.

FIG. 3 is an illustrative representation of a snapshot operation of the exemplary virtual storage system.

FIG. 4 is a flow chart depicting a methodology of exemplary operations regarding indicating non-guaranteed available capacity of the storage system.

DETAILED DESCRIPTION OF THE INVENTION

Figure 1:
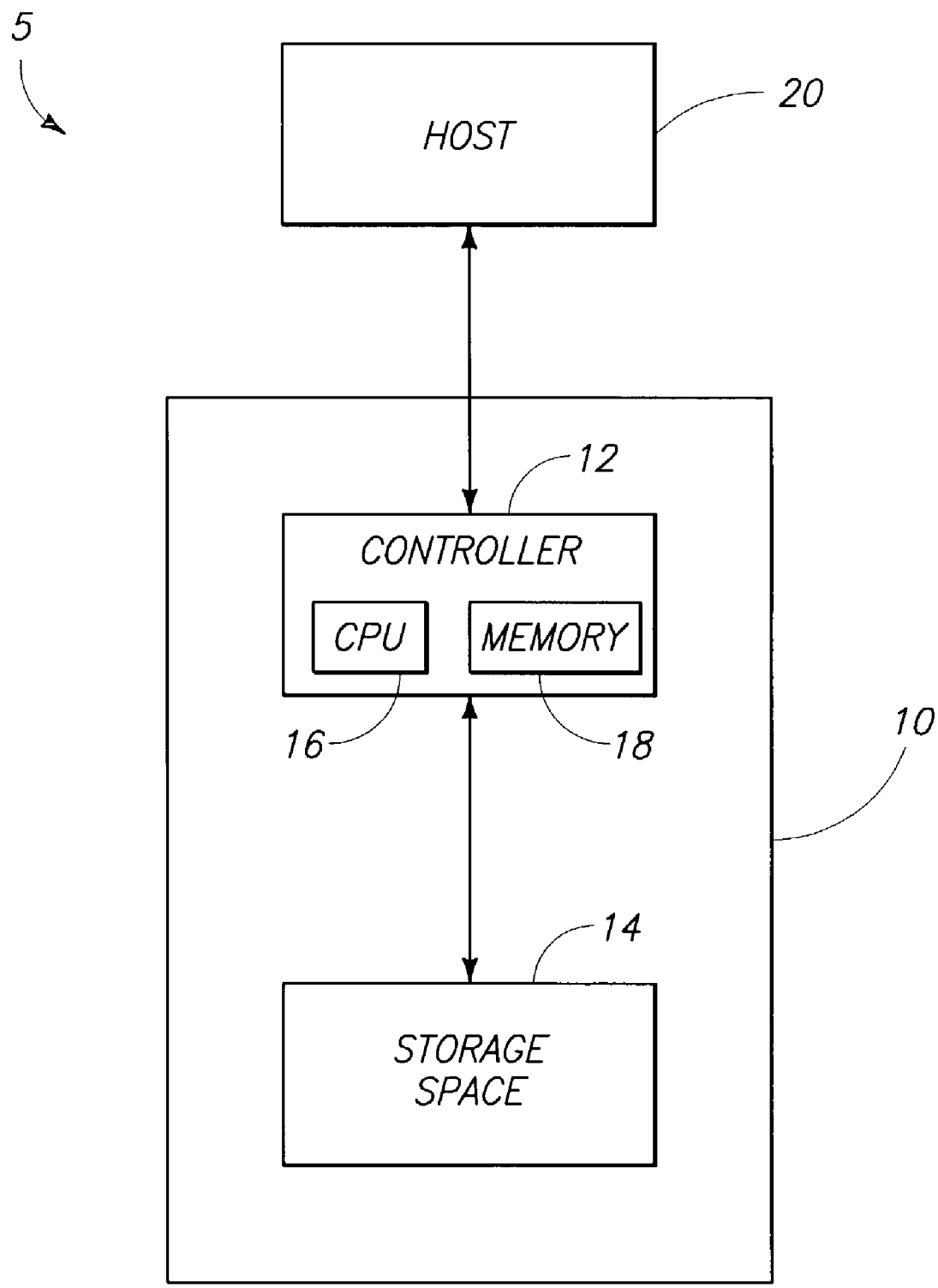
FIG. 1 is a functional block diagram of an exemplary computer system.

Attention is directed to the following commonly assigned applications, which were filed the same day as the present application and are incorporated herein by reference: U.S. Pat. No. 6,807,605, entitled "A System for Managing a Data Storage Array, a Method of Managing a Data Storage Array, and a RAID Controller," by inventors David Umberger, Guillermo Navarro and Rodger Daniels; U.S. application Ser. No. 10/264,573 filed 10/3/2002, entitled "Method of Managing a Data Storage Array, and a Computer System Including a RAID Controller," by inventors David Umberger and Guillermo Navarro; U.S. Pat. No. 10/264,659 filed 10/3/2002, entitled "Virtual Storage Systems, Virtual Storage Methods and Methods of Over Committing a Virtual RAID Storage System," by inventors Michael B. and Lee L. Nelson; U.S. Pat. No. 6,996,582, entitled "Virtual Storage Systems and Virtual Storage System Operational Methods," by inventors Rodger Daniels and Lee L. and U.S. Pat. No. 6,857,057,entitled "Virtual Storage Systems and Virtual Storage System Operational Methods," by inventors Lee L. and Rodger Daniels.

According to one aspect of the invention, a computer system comprises a virtual storage system comprising a physical storage space, a virtual storage space, and a non-guaranteed available capacity utilized to generate a plurality of non-guaranteed snapshot volumes of a plurality of virtual storage volumes of the virtual storage space, wherein the virtual storage system is configured to monitor the non-guaranteed available capacity and to present a report regarding the non-guaranteed available capacity responsive to the monitoring and a host coupled with the virtual storage system and configured to execute an application wherein generation of a non-guaranteed snapshot volume of at least one of the virtual storage volumes is desired, to access the report to determine the non-guaranteed available capacity of the virtual storage system, and to issue a request to the virtual storage system to generate the at least one non-guaranteed snapshot volume of the at least one virtual storage volume responsive to the accessing of the report.

According to another aspect of the invention, a virtual storage system comprises physical storage means comprising a plurality of physical storage locations individually configured to store digital data and controller means coupled with the physical storage means and adapted to interface with a host, wherein the controller means is configured to provide a virtual storage means comprising a plurality of virtual storage volumes to provide a representation of the physical storage space and wherein the virtual storage system has a non-guaranteed available capacity usable to generate a non-guaranteed snapshot volume of at least one of the virtual storage volumes and wherein the controller means is further configured to monitor the non-guaranteed available capacity of the virtual storage system and to generate a report of the non-guaranteed available capacity.

According to still another aspect of the invention, a virtual storage system operational method comprises providing a virtual storage system comprising a physical storage space including a plurality of physical storage locations configured to store digital data and a virtual storage space comprising a plurality of virtual storage volumes, providing a mapping system including a plurality of pointers from the virtual storage volumes to the physical storage locations, copying the pointers of one of the virtual storage volumes to generate a non-guaranteed snapshot volume comprising the same pointers as the one virtual storage volume and the copying consuming non-guaranteed available capacity of the virtual storage system and overcommitting the virtual storage system and generating a plurality of reports having a uniform format and indicating the non-guaranteed available capacity of the virtual storage system, the generating the reports comprising generating the reports before and after the copying.

According to yet another aspect of the invention, a virtual storage system operational method comprises providing a virtual storage system comprising a physical storage space including a plurality of physical storage locations configured to store digital data and a virtual storage space comprising a plurality of virtual storage volumes, mapping a plurality of addresses of the virtual storage space to a plurality of physical storage locations of the physical storage space, monitoring a plurality of statuses of the virtual storage system and generating a report indicating non-guaranteed available capacity of the virtual storage system after the monitoring.

Referring to FIG. 1, an exemplary arrangement of a computer system is depicted as reference number 5. The exemplary computer system 5 includes a data storage system 10 and a host 20. According to aspects of the invention, storage system 10 is embodied as a virtual storage system. In one arrangement, storage system 10 is a virtual array (RAID) storage system having abstract addressing or mapping between a virtual storage space and physical storage space as described in further detail below. Virtual storage system arrangements differ from conventional disk array constructions which utilize mathematical functions to provide literal addressing which are fixed to blocks of physical storage space wherein a given address corresponds to a known physical block. Virtual storage systems implement adaptive, dynamic and arbitrary addressing enabling increased flexibility compared with conventional arrangements. For example, a plurality of virtual storage addresses of virtual storage space may be utilized to address a single physical storage location of physical storage space. In such a virtual storage system arrangement, point in time copies of data, also referred to as snapshot volumes of data, may be created which may result in over commitment of a virtual storage system as divergence of data occurs. Virtual storage system arrangements provide increased apparent capacity and flexibility compared with conventional constructions.

Storage system 10 arranged as a virtual storage configuration utilizes linear addressing space according to a Small Computer System Interface (SCSI) command set in one exemplary configuration. Although the presentation of storage system 10 to a host 20 may be consistent at different moments in time, a mapping system of a virtual storage system arrangement may change to accommodate demands or requirements of the storage system. Exemplary details regarding a virtual storage system are discussed in U.S. Pat. No. 5,392,244 to Jacobson et al., the teachings of which are incorporated herein by reference. Further details and aspects of virtual array technology are described in HP Virtual Array Technology, 2001 and Executive Summary: Virtualization, Simplification and Storage, Nov. 2001, both available from www.hp.com, and the teachings of which are incorporated herein by reference.

Still referring to FIG. 1, storage system 10 in the exemplary described arrangement includes a controller 12 and storage space 14 arranged to store data. Storage system 10 in the illustrated application is configured to interface with host 20. Storage system 10 is arranged to store data received from host 20 as well as provide requested data to host 20. Host 20 may be implemented as a workstation, personal computer, server, network of computer devices, or other appropriate computer structure utilizing a separate data storage system.

In accordance with one possible implementation, host 20 executes a plurality of applications desired by a particular user. As described further below, host 20, or other entity including for example, storage system 10, may desire the generation of a snapshot of data stored within storage system 10, also referred to as a business copy. Host 20 may access reports including status information from system 10 and/or issue snapshot volume generation requests to system 10 in instances wherein host 20 desires the generation of a snapshot volume using system 10. Further details regarding accessing status information and generation of snapshot volumes are described in detail with respect to exemplary configurations below.

In the illustrated configuration, controller 12 is arranged to implement interfacing operations with respect to host 20 including handling of input/output (I/O) requests. In addition, controller 12 provides management of storage space 14 including addressing of storage space 14 and implementing storage of data therein. As described below in one exemplary configuration, controller 12 is arranged to create a virtual storage space representation of physical storage space and a mapping system to provide addressing therebetween.

In the depicted exemplary arrangement, controller 12 includes a central processing unit (CPU) 16 and memory 18. An exemplary central processing unit is a PowerPC 440 or 8240 available from Motorola, Inc.

Controller 12 of storage system 10 may be configured to implement AutoRAID operations as described in the '244 patent discussed above. Controller 12 implementing AutoRAID operations may monitor use of data stored within system 10 and determine a best RAID level for the data. For example, infrequently written data is stored in RAID 5DP providing storage efficiency while frequently written data may be stored in RAID 1+0 providing optimum performance. Data may be moved between RAID levels depending upon the age of the data, frequency of accessing the data, and other factors.

Memory 18 may be utilized to store maps as described further below for use in addressing storage space 14, to store executable code usable by controller 12, and to provide a cache for temporarily storing data. Memory 18 may include a plurality of separate memory areas for storing executable code, maps, and cache in one embodiment.

Referring to FIG. 2, an illustrative representation of storage space 14 of system 10 is shown. Storage space 14 includes a virtual storage space 22 and a physical storage space 24 according to an exemplary virtual storage architecture of the described system 10. Virtual storage space 22 includes a plurality of virtual storage volumes 26 and physical storage space 24 includes a plurality of physical storage volumes 28. The depicted number of volumes 26, 28 is exemplary and more or less volumes 26 or volumes 28 may be utilized in a given application.

Virtual storage volumes 26 may be referred to as logical unit numbers (LUNs), logical volumes or logical drives. Virtual storage space 22 including virtual storage volumes 26 provide a convenient representation of storage capacity to host 20. Host 20 may utilize a SCSI command set to implement addressing of storage space 14 including virtual storage volumes 26. Host 20 may implement a logical volume manager, such as LVM software for use in an HP-UX operating system and available from Hewlett-Packard Company, to provide centralized management of storage system 10. For example, a logical volume manager may provide a virtualization of data storage of storage system 10 within host 20 for use in interfacing storage system 10 with host applications. Management features of system 10 may appear in a plurality of software management interfaces: SCSI command set, Virtual Front Panel (VFP), Graphical User Interface (GUI), Command Line User Interface (CLUI), Application Programming Interface (API), etc. for use in various solutions integrations.

Physical storage volumes 28 may comprise an array of disks individually configured to provide actual storage digital data (i.e., no data is stored using virtual storage space in the described configuration). In one aspect, controller 12 controls storage of data using volumes 28 according to desired RAID levels. The number of volumes 28 may be tailored to the particular implementation of system 10.

Virtual storage space 22 provides an abstract representation of physical storage space 24 to host 20. Virtual storage space 22 may be modified as desired by controller 12 or host 20. For example, virtual storage space 22 may be tailored to represent physical storage space 24 in a format which may be conveniently accessed by host 20. In turn, a logical volume manager of host 20 may provide yet another virtual abstraction of virtual storage space 22 (not shown) in a format which may be conveniently utilized by host applications.

Virtual storage space 22 of system 10 includes a plurality of addresses or storage locations 30. The depicted exemplary physical storage space 24 includes a plurality of addresses or storage locations 36. Addresses 30 of virtual storage space 22 are utilized to provide addressing of addresses 36 of physical storage space 24 wherein data is stored.

For example, in one embodiment, controller 12 operates to create and implement a mapping system 32 comprising a plurality of pointers 34. Pointers 34 of mapping system 32 may be stored within memory 18 and associate a plurality of respective addresses 30 of virtual storage space 22 with respective addresses 36 of physical storage space 24.

Host 20 may read or write data with respect to system 10 by submitting requests. Such requests may address a storage location 30 of virtual storage volumes 26. A request received from host 20 identifying a virtual storage location 30 has an associated pointer 34 which identifies the respective physical storage location 36 which contains the actual data to be read by host 20, or written to by host 20, as indicated in the request identifying the virtual storage location 30.

Individual virtual storage locations 30 may represent a common predefined amount of data at physical storage locations 36 in the described implementation. For example, virtual storage locations 30 may refer to clusters including 512 blocks which individually include 512 bytes of data in one exemplary arrangement. Accordingly, a virtual storage location 30 refers to a cluster size piece of data of a respective physical storage location 36 including 512 blocks individually comprising 512 bytes of data providing a total of 256 kbytes of data per physical storage address or location 36 in one embodiment.

Storage system 10 arranged according to a virtual storage architecture is able to implement operations not capable in conventional RAID systems. For example, controller 12 may create a virtual copy of a storage volume 26 by duplicating the pointers of the original volume 26 being copied rather than duplicating the data itself. Such duplication of pointers may be referred to as providing a point in time copy or a snapshot of a virtual storage volume 26.

Referring to FIG. 3, additional details of exemplary point in time copy or snapshot operations are described. A plurality of virtual storage volumes 26 and physical storage volumes 28 are shown in FIG. 3. A first virtual storage volume 40 may be referred to as a parent or original volume while a second virtual storage volume 42 may be referred to as a snapshot volume 42. Snapshot operations may be performed to create a new snapshot volume or to refresh an existing snapshot volume to provide a snapshot of the original volume.

In the depicted example, original volume 40 includes a plurality of respective pointers 34 at a given moment in time which map virtual storage locations 30 to physical storage locations 36. During a snapshot operation, controller 12 creates another virtual storage volume 42 of the original volume 40. In one embodiment, controller 12 copies the associated pointers 34 of volume 40 and creates volume 42 including the same pointers 34 pointing to or addressing the same physical storage locations 36 as original volume 40 at the moment in time when volume 40 is snapped.

When first created, snapshot volume 42 shares all of its associated physical storage space 28 with original volume 40. Thereafter, data of either the snapshot volume 42 or the original volume 40 may be updated responsive to operations from host 20 or internal operations of controller 12. When an update occurs, new physical storage space is allocated to hold the new/modified data. The corresponding pointer(s) 34 for the new/modified data of either the snapshot volume 42 or the original volume 40 (i.e., the volume that received the new/modified data) are set to point to the new physical storage address 36 storing the new data while the corresponding respective pointer(s) 34 of the unmodified data point to the same or original address(s) 36 to preserve the snapped data. The provision of new pointers for the new\modified data process is called divergence. Space that has diverged is no longer shared between snapshot volume 42 and original volume 40.

For example, as shown in FIG. 3, a virtual storage location 44 initially addresses a physical storage location 46. Accordingly, following a snapshot operation 47 of original volume 40, a respective virtual storage location 48 of snapshot volume 42 also addresses physical storage location 46. Thereafter, assume a first write operation 49 occurs to virtual storage location 44. Data is retrieved from physical storage location 46, modified by the first write operation, and stored as diverged data in a new physical storage location 50. The pointer 34 associated with virtual storage location 44 becomes a divergence pointer to address physical storage location 50 following the first write operation 48. However, a pointer 34 of virtual storage location 48 of snapshot volume 42 still addresses physical storage location 46 providing access to the unmodified original data which was snapped.

Updates to data of snapshot volume 42 may also occur as illustrated by the exemplary second write operation 52 to a virtual storage location 54 of snapshot volume 42. A pointer 34 previously associated with virtual storage location 54 and a corresponding physical storage location 55 is adjusted to now refer to a new physical storage location 56 following the second write operation and including the modified data which was previously stored as physical storage location 55. A pointer 34 associated with a virtual storage location 58 of original volume 40 still addresses physical storage location 55 following the second write operation.

Since a snapshot volume does not consume additional physical storage space at the moment in time the parent volume is snapped, it is possible to configure a snapshot volume so that available physical storage space of storage system 10 becomes exhausted as divergence occurs. System 10 permits snapshot operations even if system 10 does not have sufficient physical storage space to accommodate divergence of the resulting snapshot volume as data is modified. This state of the storage system 10 or physical storage space 24 may be referred to as over committed. It may be advantageous to allow storage system 10 to become over committed because one or more snapshot volumes of system 10 may not experience complete divergence in their cycle of use. In such a case and with over commitment, storage system 10 may give an appearance that it has more storage space (represented by virtual storage space) than its available physical storage space.

Accordingly, in at least one embodiment, available physical storage space of system 10 does not constrain configuration of snapshot volumes. However, it may be desired to constrain the generation of snapshot volumes for other reasons, or other constraints may exist within a given design of storage system 10 which limit the generation of snapshot volumes even though the physical storage available capacity is not a constraint. Some aspects of the invention provide apparatus and methods for indicating a non-guaranteed available capacity of storage system 10 which indicates the remaining capacity of system 10 to create non-guaranteed snapshot volumes.

In one aspect of the invention, snapshot volumes may be individually associated with a specific category including guaranteed snapshot volumes or non-guaranteed snapshot volumes upon creation of the respective snapshot volumes. Guaranteed snapshot volumes may correspond to volumes including critical data of host 20 (or otherwise indicated by a system administrator or other entity to be critical) while non-guaranteed snapshot volumes may correspond to non-critical data of host 20 (or otherwise indicated by the system administrator or other entity to be non-critical). According to this exemplary aspect, critical data may refer to data which has increased priority or importance compared with non-critical data.

In one operational aspect of storage system 10, guaranteed snapshot volumes are dependent upon the physical storage space and are created if sufficient physical storage space is present to store an entirety of the data of the parent volume being snapped or copied. Non-guaranteed snapshot volumes may be created independent of remaining physical storage space and the creation of such volumes may result in over commitment of the physical storage space. Additional exemplary details of guaranteed and non-guaranteed snapshot volumes are described in a U.S. patent application Ser. No. 10/264,659 filed Oct. 3, 2002 entitled "Virtual Storage Systems, Virtual Storage Methods And Methods Of Over Committing A Virtual RAID Storage System" listing Michael Jacobson and Lee Nelson as inventors, having docket number 100110845-1 and the teachings of which are incorporated herein by reference. Aspects of the incorporated patent application provide automatic deletion of snapshot volumes as physical space nears exhaustion to avoid data unavailability or data loss.

Aspects of the invention utilize non-guaranteed available capacity to represent constraints on the generation of snapshot volumes using storage system 10 independent of an underlying implementation of storage system 10. Representations of non-guaranteed available capacity may be presented whether over commitment of physical space or other features of storage system 10 are the source of a constraint. As mentioned previously, non-guaranteed available capacity indicates a remaining capacity of storage system 10 to create non-guaranteed snapshot volumes. Accordingly, non-guaranteed available capacity is consumed as new non-guaranteed snapshot volumes are created.

According to one exemplary operational protocol of the present invention, one or more status impacting non-guaranteed available capacity may be monitored and utilized to represent non-guaranteed available capacity of storage system 10. Controller 12 may be arranged to monitor one or more status of storage system 10 to provide information regarding non-guaranteed available capacity according to presently described aspects of the invention. Since non-guaranteed available capacity is not limited by the physical storage space, CPU 16 of controller 12 may monitor one or more status independent of the physical storage space to determine non-guaranteed available capacity.

For example, a status corresponding to the mapping system of storage system 10 may be monitored to represent non-guaranteed available capacity. As mentioned above, storage system 10 may utilize a mapping system comprising a plurality of pointers to implement addressing intermediate the virtual storage space and the physical storage space. The mapping system and the pointers are stored in memory 18 of controller 12 in one embodiment. In the described arrangement, memory 18 has a finite size and accordingly can store a mapping system having a finite size and a respective number of pointers. In such an arrangement, portions of memory 18 allocated to the storage of pointers may constrain the creation of non-guaranteed snapshot volumes even though the physical storage available capacity is not a constraint. The remaining available capacity of memory 18 to store pointers is one exemplary status which may be monitored to provide monitoring of non-guaranteed available capacity.

In one embodiment, CPU 16 polls memory 18 to determine the available mapping space for storage of pointers for the mapping system (also referred to as the remaining available capacity of pointers). The pointers may be individually associated with a predetermined amount of non-guaranteed capacity and accordingly the number of available pointers capable of being stored within memory 18 may be converted to non-guaranteed capacity.

Alternate or additional statuses of storage system 10 may be monitored to determine non-guaranteed available capacity. Exemplary statuses include limitations for product structuring and marketing purposes. For example, non-guaranteed available capacity licenses (e.g., 10 TB, 20TB, 30TB, etc.) may be purchased with storage system 10. CPU 16 may monitor the consumed non-guaranteed capacity of storage system 10 with respect to the respective license for non-guaranteed available capacity of system 10 and the license may be the limiting constraint on the non-guaranteed available capacity. The above-described statuses of storage system 10 which may be monitored are exemplary and other status(es) may be monitored according to additional aspects of the invention (e.g., number and sizing of mapping space fragments discussed below).

In addition to monitoring operations described above, the described exemplary storage system 10 may be arranged to indicate an ability of system 10 to create non-guaranteed snapshot volumes by indicating the non-guaranteed available capacity of storage system 10 at one or more moment in time according to other aspects of the invention. One exemplary indication operation enables the generation of a report to indicate the non-guaranteed available capacity of storage system 10 at one or more moment in time. For example, storage system 10 may generate and make available the report responsive to a request from host 20 in one aspect. In another aspect, storage system 10 may update and make available the report at predefined moments in time (e.g., every second or other desired interval). In addition, reports may be generated at periodic moments in time to provide information regarding the current state of storage system 10 (e.g., before and after the generation of a new snapshot volume) or according to other desired protocols.

Exemplary reports generated include information which may be utilized in determining the number and/or size of non-guaranteed snapshot volumes which can be created at respective moments in time as one or more status of storage system 10 changes. The non-guaranteed available capacity may be represented in a number of ways in exemplary reports. For example, one possible configuration of the reports indicates overall or total non-guaranteed available capacity of storage system 10, a number of non-guaranteed available capacity fragments, and/or the size of the respective fragments in order from largest to smallest. Fragments represented in such an exemplary report indicate mapping fragments of mapping space available to create non-guaranteed snapshot volumes.

One exemplary cause of fragments in non-guaranteed available capacity is constraints in available mapping space (e.g., remaining memory available for pointers). Other reasons for fragmentation of non-guaranteed available capacity may exist. Alternatively, fragments of non-guaranteed available capacity may not exist in other configurations or implementations wherein non-guaranteed available capacity could be represented as a single value.

In one exemplary embodiment of storage system 10, the size of a non-guaranteed snapshot volume capable of being created at a given moment in time is limited by the size of the largest mapping fragment available at the particular moment in time. In addition, individual fragments correspond to individual non-guaranteed snapshot volumes which may be created in the exemplary embodiment. According to additional exemplary details, CPU 16 may monitor a status including the number and size of mapping fragments currently available for use within storage system 10 at moments in time to monitor the non-guaranteed available capacity of system 10.

Referring to Table A below, an exemplary report is shown which provides one possible format for indicating non-guaranteed available capacity of a storage system 10 according to aspects of the invention. Other report format configurations are possible. In addition, the non-guaranteed available capacity may be represented in additional or alternative ways according to other aspects of the invention.

TABLE A

| TOTAL | 47 GB |
|---|---|
| FRAGMENT 1 | 22 GB |
| FRAGMENT 2 | 10 GB |
| FRAGMENT 3 | 8 GB |
| FRAGMENT 4 | 7 GB |

According to the exemplary report of Table A, storage system 10 may create four non-guaranteed snapshot volumes with the largest possible snapshot volume capable of being created having a size of 22 GB at the particular moment in time when the report was generated and in accordance with the above-described operational protocol.

As mentioned above, a plurality of reports may be generated at a plurality of moments in time to indicate the status of storage system 10. In one aspect, the reports have a uniform format, such as the exemplary format depicted in Table A. As shown in the exemplary format, the report may provide the non-guaranteed available capacity without indicating the particular limitation which constrains or limits the non-guaranteed available capacity. For example, if five fragments of mapping space are available at a moment in time, and the licensed non-guaranteed available capacity would be exceeded if all five fragments were consumed during the generation of five corresponding non-guaranteed snapshot volumes, the controller 16 may generate the report indicating that a number of fragments less than five are available to assure that the non-guaranteed available capacity is not misrepresented and without representing or indicating the constraining status.

Host 20 during execution of applications, or for other reasons, may desire to access or determine the non-guaranteed available capacity of storage system 10 (e.g., if host 20 wishes to generate a non-guaranteed snapshot volume). Accordingly, controller 12 may be arranged to provide accessibility of host 20 to generated reports in one aspect. Host 20 may request the reports from storage system 10 and/or controller 12 may periodically communicate current status reports to host 20 indicating the non-guaranteed available capacity. When it is desired to make a non-guaranteed snapshot of data within storage system 10, host 20 analyzes the report and determines if there is sufficient non-guaranteed available capacity to accommodate the snapshot operation. If non-guaranteed available capacity exists, host 20 may issue a request to storage system 10 to initiate the snapshot operation of the desired data. Operations according to the described exemplary procedure minimize lengthy polling of individual statuses of storage system 10 by host 20 to determine if capacity exists for creating a snapshot volume.

Referring to FIG. 4, an exemplary operational method executable by controller 12 to implement aspects of the invention described above is illustrated. The depicted methodology may be embodied as executable code within memory 18 and executed by CPU 16. The methodology is presented to illustrate exemplary steps for performing aspects of the invention. Other methods are possible including more, less or alternative steps.

Initially at a step S10, the controller is configured to monitor one or more status of storage system 10 and including for example a remaining available capacity of mapping pointers, non-guaranteed available capacity remaining under a purchased license, the number and size of mapping space fragments, and/or other status. Step S10 may be executed responsive to a request from host 20, at predefined moments in time, or responsive to other appropriate stimulus.

At a step S12, the controller operates to generate and present a report regarding non-guaranteed available capacity of storage system 10. For example, the controller may provide host 20 or other entities access to the report.

At a step S14, the controller monitors for the reception of a snapshot operation request.

If the condition of step S14 is negative, the controller may continue to monitor and update one or more status and update the report regarding non-guaranteed available capacity at steps S10 and S12.

If the condition of step S14 is affirmative, the controller may proceed to generate the requested snapshot volume at a step S16. Thereafter, the controller may monitor and update one or more status and update the report regarding non-guaranteed available capacity at steps S10 and S12.

Aspects of the invention provide structural and methodical aspects of representing constraints on usage of snapshot operations without exposing implementation specific attributes of the design of storage system 10. Aspects of the invention enable non-guaranteed available capacity to be communicated without presenting individual specific constraints in a management interface. Users and software applications that utilize over committed storage systems need not be aware of the underlying details of the implementation (e.g., which features to poll regarding capacity) to determine the non-guaranteed available capacity according to aspects of the invention. This allows user experience and software applications to be reused on different implementations of snapshot operations and other features that result in over commitment which results in over commitment being a more manageable and useful capability.

The protection sought is not to be limited to the disclosed embodiments, which are given by way of example only, but instead is to be limited only by the scope of the appended claims.

What is claimed is:

1. A computer system comprising:
a virtual storage system comprising a physical storage space, a virtual storage space, and a non-guaranteed available capacity utilized to generate a plurality of non-guaranteed snapshot volumes of a plurality of virtual storage volumes of the virtual storage space, wherein the virtual storage system is configured to monitor the non-guaranteed available capacity and to present a report regarding the non-guaranteed available capacity responsive to the monitoring; and
a host coupled with the virtual storage system and configured to execute an application wherein generation of a non-guaranteed snapshot volume of at least one of the virtual storage volumes is desired, to access the report to determine the non-guaranteed available capacity of the virtual storage system, and to issue a request to the virtual storage system to generate the at least one non-guaranteed snapshot volume of the at least one virtual storage volume responsive to the accessing of the report.

2. The system of claim 1 wherein the virtual storage system is configured to generate the non-guaranteed snapshot volume of the at least one virtual storage volume responsive to the request and resulting in over commitment of the physical storage space.

3. The system of claim 2 wherein the virtual storage system is configured to generate a plurality of the reports before and after the generation of the non-guaranteed snapshot volume.

4. The system of claim 1 wherein the virtual storage system is configured to present the report having a uniform format at a plurality of moments in time.

5. The system of claim 1 wherein the virtual storage system is configured to present the report indicating overall non-guaranteed available capacity of the virtual storage system, a plurality of fragments, and a plurality of sizes of the respective fragments.

6. The system of claim 1 wherein the virtual storage system is configured to present the report without indicating a particular status limiting the non-guaranteed available capacity.

7. The system of claim 1 wherein the virtual storage system is configured to monitor the non-guaranteed available capacity without monitoring the physical storage space.

8. The system of claim 1 wherein the virtual storage system is configured to monitor the non-guaranteed available capacity using a remaining available capacity of pointers intermediate the physical storage space and the virtual storage space.

9. The system of claim 1 wherein the virtual storage system is configured to generate the at least one non-guaranteed snapshot volume comprising a plurality of pointers which address the same physical storage locations as a plurality of respective pointers of the parent virtual storage volume utilized to generate the at least one non-guaranteed snapshot volume.

10. The system of claim 1 wherein the virtual storage system is configured to generate guaranteed snapshot volumes dependent upon available capacity of the physical storage space and to generate the non-guaranteed snapshot volumes independent of the available capacity of the physical storage space.

11. The system of claim 10 wherein the virtual storage system is configured to generate at least one of the non-guaranteed snapshot volumes when the available capacity of the physical storage space is insufficient to store data of the at least one non-guaranteed snapshot volume.

12. The system of claim 10 wherein the virtual storage system is configured to generate the non-guaranteed snapshot volumes without usage of the physical storage space.

13. The system of claim 1 wherein the non-guaranteed available capacity is not limited by the physical storage space.

14. A virtual storage system comprising:
physical storage means comprising a plurality of physical storage locations individually configured to store digital data; and
controller means coupled with the physical storage means and adapted to interface with a host, wherein the controller means is configured to provide a virtual storage means comprising a plurality of virtual storage volumes to provide a representation of the physical storage space and wherein the virtual storage system has a non-guaranteed available capacity usable to generate a non-guaranteed snapshot volume of at least one of the virtual storage volumes and wherein the controller means is further configured to monitor the non-guaranteed available capacity of the virtual storage system and to generate a report of the non-guaranteed available capacity.

15. The system of claim 14 wherein the controller means is configured to present the report to the host.

16. The system of claim 14 wherein the controller means is configured to perform a snapshot operation of the at least one virtual storage volume to provide a non-guaranteed snapshot volume of the at least one virtual storage volume.

17. The system of claim 16 wherein the controller means is configured to generate a plurality of the reports before and after the performing of the snapshot operation.

18. The system of claim 16 wherein the snapshot operation over commits a capacity of the physical storage space.

19. The system of claim 14 wherein the controller means is configured to generate the report having a uniform format at a plurality of moments in time.

20. The system of claim 14 wherein the controller means is configured to generate the report without indicating a particular status limiting the non-guaranteed available capacity.

21. The system of claim 14 wherein the controller means is configured to monitor the non-guaranteed available capacity without monitoring the physical storage space.

22. The system of claim 14 wherein the controller means maps a plurality of virtual storage addresses of the virtual storage space to a plurality of respective physical storage locations of the physical storage space using a plurality of pointers, and the controller means is further configured to monitor the non-guaranteed available capacity using a remaining available capacity of the pointers.

23. The system of claim 14 wherein the virtual storage system is configured to generate the at least one non-guaranteed snapshot volume comprising a plurality of pointers which address the same physical storage locations as a plurality of respective pointers of a parent virtual storage volume utilized to generate the at least one snapshot volume.

24. The system of claim 14 wherein the controller means is configured to generate guaranteed snapshot volumes dependent upon available capacity of the physical storage means and to generate the non-guaranteed snapshot volumes independent of the available capacity of the physical storage means.

25. The system of claim 14 wherein the controller means is configured to output the report for communication to the host.

26. A virtual storage system operational method comprising:
   providing a virtual storage system comprising:
      a physical storage space including a plurality of physical storage locations configured to store digital data; and
      a virtual storage space comprising a plurality of virtual storage volumes;
   providing a mapping system including a plurality of pointers from the virtual storage volumes to the physical storage locations;
   copying the pointers of one of the virtual storage volumes to generate a non-guaranteed snapshot volume comprising the same pointers as the one virtual storage volume and the copying consuming non-guaranteed available capacity of the virtual storage system and overcommitting the virtual storage system; and
   generating a plurality of reports having a uniform format and indicating the non-guaranteed available capacity of the virtual storage system, the generating the reports comprising generating the reports before and after the copying.

27. The method of claim 26 further comprising identifying a limitation of the non-guaranteed available capacity of the virtual storage system, and wherein the generating the reports comprises generating the reports indicating the non-guaranteed available capacity of the virtual storage system without disclosing the identified limitation.

28. The method of claim 27 wherein the identifying comprises identifying the limitation comprising a remaining available capacity of the pointers.

29. The method of claim 26 wherein the generating the reports comprises generating the reports individually comprising overall non-guaranteed available capacity of the virtual storage system, a plurality of fragments, and a plurality of sizes of the respective fragments.

30. The method of claim 26 wherein the generating the reports comprises generating the reports without monitoring the physical storage space.

31. The method of claim 26 wherein the generating the reports comprises generating using a controller of the virtual storage system, and further comprising communicating the reports from the virtual storage system to a host coupled with the virtual storage system.

32. The method of claim 26 further comprising generating, using the virtual storage system, guaranteed snapshot volumes dependent upon available capacity of the physical storage space and non-guaranteed snapshot volumes independent of the available capacity of the physical storage space, and wherein the non-guaranteed available capacity is indicative of capacity of the virtual storage system to create non-guaranteed snapshot volumes.

33. A virtual storage system operational method comprising:
   providing a virtual storage system comprising:
      a physical storage space including a plurality of physical storage locations configured to store digital data; and
      a virtual storage space comprising a plurality of virtual storage volumes;
   mapping a plurality of addresses of the virtual storage space to a plurality of physical storage locations of the physical storage space;
   monitoring a plurality of statuses of the virtual storage system; and
   generating a report indicating non-guaranteed available capacity of the virtual storage system after the monitoring.

34. The method of claim 33 further comprising generating a non-guaranteed snapshot volume of at least one of the virtual storage volumes, and wherein the generating the non-guaranteed snapshot volume results in over commitment of the virtual storage system.

35. The method of claim 34 wherein the generating the report comprises generating the report before and after the generating of the non-guaranteed snapshot volume.

36. The method of claim 33 wherein the generating the report comprises generating a plurality of the reports having a uniform format at a plurality of moments in time.

37. The method of claim 33 wherein the generating the report comprises generating the report indicating overall non-guaranteed available capacity of the virtual storage system, a plurality of fragments, and a plurality of sizes of the respective fragments.

38. The method of claim 33 wherein the monitoring comprises identifying a limitation of the non-guaranteed available capacity of the virtual storage system, and the generating the report comprises generating the report indicating the non-guaranteed available capacity of the virtual storage system without disclosing the identified limitation.

39. The method of claim 38 wherein the mapping comprises mapping using a plurality of pointers, and the identifying comprises identifying the limitation comprising a remaining available capacity of the pointers.

40. The method of claim 33 wherein the monitoring comprises monitoring independent of the physical storage space.

41. The method of claim 33 wherein the mapping comprises mapping using a plurality of pointers, and the monitoring comprises monitoring the non-guaranteed available capacity using a remaining available capacity of the pointers.

42. The method of claim 33 further comprising generating a non-guaranteed snapshot volume comprising a plurality of pointers identical to a plurality of pointers of at least one of the virtual storage volumes and which address the same physical storage locations as the pointers of the at least one virtual storage volume.

43. The method of claim 33 wherein the generating the report comprises generating using a controller of the virtual storage system, and further comprising communicating the report from the virtual storage system to a host coupled with the virtual storage system.

44. The method of claim 33 further comprising generating, using the virtual storage system, guaranteed snapshot volumes dependent upon available capacity of the physical storage space and non-guaranteed snapshot volumes independent of the available capacity of the physical storage space, and wherein the non-guaranteed available capacity is indicative of capacity of the virtual storage system to create non-guaranteed snapshot volumes.

* * * * *

UNITED STATES PATENT AND TRADEMARK OFFICE
CERTIFICATE OF CORRECTION

| | |
|---|---|
| PATENT NO. | : 7,089,395 B2 |
| APPLICATION NO. | : 10/264957 |
| DATED | : August 8, 2006 |
| INVENTOR(S) | : Michael B. Jacobson et al. |

It is certified that error appears in the above-identified patent and that said Letters Patent is hereby corrected as shown below:

In column 9, lines 40-41,
insert -- NON-GUARANTEED AVAILABLE CAPACITY -- above "TABLE A".

Signed and Sealed this

Twenty-eighth Day of April, 2009

JOHN DOLL
*Acting Director of the United States Patent and Trademark Office*